United States Patent [19]

Blake

[11] 4,307,931
[45] Dec. 29, 1981

[54] MICROSCOPE EYESHIELD
[75] Inventor: Charles S. Blake, Tonawanda, N.Y.
[73] Assignee: American Optical Corporation, Southbridge, Mass.
[21] Appl. No.: 176,943
[22] Filed: Aug. 11, 1980
[51] Int. Cl.³ .............................................. G02B 23/16
[52] U.S. Cl. .................................................... 350/57
[58] Field of Search .................... 350/57, 58, 65, 257, 350/318, 319

[56] References Cited
U.S. PATENT DOCUMENTS

| | | | |
|---|---|---|---|
| 1,668,975 | 5/1928 | Paulus et al. | 350/57 |
| 2,271,380 | 11/1942 | Strang et al. | 350/57 |

FOREIGN PATENT DOCUMENTS 414152  5/1925  Fed. Rep. of Germany ........ 350/57

Primary Examiner—Jon W. Henry
Attorney, Agent, or Firm—Alan H. Spencer

[57] ABSTRACT

A microscope eyeshield of flexible material has internal ribs of different diameters. Small diameter ribs frictionally engage small diameter eyepieces while the larger diameter ribs are for larger diameter eyepieces. A groove adjacent each small diameter rib permits the respective small diameter rib to be displaced into the groove when the eyeshield is fitted to a larger diameter eyepiece.

6 Claims, 3 Drawing Figures

U.S. Patent  Dec. 29, 1981  4,307,931
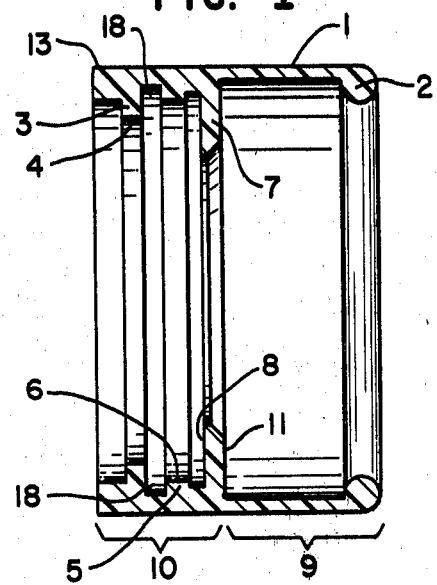
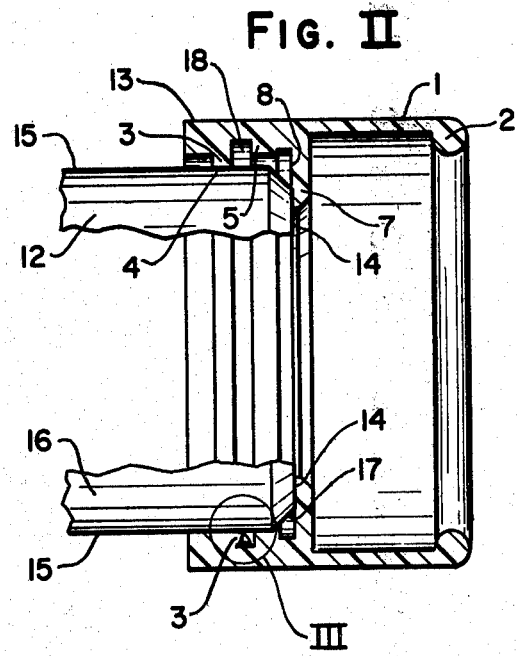
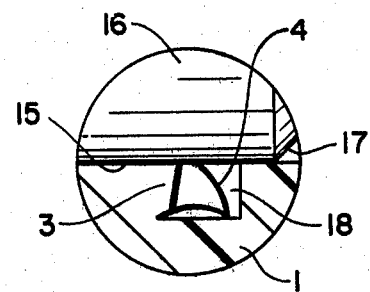

MICROSCOPE EYESHIELD

BACKGROUND OF THE INVENTION

This invention relates to microscope eyepiece eyeshields and more particularly to eyeshields adapted to fit eyepieces of different diameters.

Microscope eyeshields have conventionally been made to fit eyepieces of a single diameter. Microscope manufacturers usually provide a different eyeshield for each eyepiece size. Such eyeshields are generally made of plastic or rubber. The plastic eyeshields are semi-rigid and are designed to slip over the end of the eyepiece without frictional engagement. The rubber eyepieces, while flexible, are not designed to properly fit eyepieces of different sizes. One reason that rubber eyepieces may not be used on different sizes of eyepieces is that they are intended to permit the portion extending beyond the eyepiece to be folded back over the portion engaging the eyepiece, to accommodate an observer wearing glasses.

It is an object of the present invention to provide a microscope eyeshield capable of fitting more than one size eyepiece.

It is another object of the present invention to provide a flexible eyeshield capable of fitting more than one size eyepiece and able to be folded back to accommodate observers wearing glasses.

BRIEF DESCRIPTION OF THE INVENTION AND DRAWINGS

An eyeshield for a microscope eyepiece has at least two, and preferably at least three internal ribs adapted to engage eyepieces of large and small diameter. An internal groove extending radially around the hollow eyepiece body provides a receptacle for the rib for small eyepieces when the eyeshield is used on larger eyepieces. Preferably, the eyeshield is formed of a material having sufficient flexibility to permit the portion of the eyeshield extending beyond the eyepiece to be folded back on the portion of the eyeshield engaging the eyepiece.

FIG. I is a cross-sectional side view of an embodiment according to the present invention;

FIG. II is a side view, partly in section, of the embodiment of FIG. I exemplifying engagement with representative large and small eyepieces; and FIG. III is an enlarged view of the portion of FIG. II in circle III.

THE BEST MODE

Referring to FIG. I, body 1 is formed of a flexible material with lip 2 at one end to provide comfortable contact with an observer's face (not shown). Rib 3 extends radially inwardly from body 1 and has a relatively small circumferential surface 4. Rib 5 extends radially inwardly from body 1 and has a larger circumferential surface 6. Shoulder 7 also extends radially inwardly from body 1. Face 8 of shoulder 7 is adapted to limit penetration of an eyepiece into body 1. Portion 9 of body 1 is adapted to be folded back over portion 10 when an observer wears glasses. When folded back, face 11 of shoulder 7 protects the observer's glasses from becoming scratched on an eyepiece.

Referring to FIG. II, a small eyepiece 12 is inserted into distal end 13 of body 1 until eyepiece end 14 seats against face 8. Since eyepiece 12 is of a small diameter, surface 4 of rib 3 frictionally engages tube 15 of eyepiece 12. A larger eyepiece 16 is inserted into distal end 13 of body 1 until eyepiece end 14 seats against face 8. Since eyepiece 16 is of a larger diameter, bevel 17 forces rib 3 into groove 18 extending radially around the inside of body 1 as eyepiece 16 moves toward face 8. Surface 6 of rib 5 engages tube 15 to maintain substantially uniform displacement of rib 3.

FIG. III is an enlargement showing the displacement of rib 3 into groove 18 by bevel 17 and tube 15.

The present invention contemplates more than one rib with an adjacent groove if a large range of eyepiece diameters are to be accomplished. However, one small rib has been found adequate to accommodate eyepieces of diameters ranging from 1.062 to 1.181 inches.

I claim:

1. An eyeshield adapted for mounting over microscope eyepieces of small and large diameters which comprises, a hollow cylindrical body, said body being formed of a flexible material, a plurality of spaced ribs extending radially inwardly from said body for engaging an eyepiece, one of said plurality of ribs having a first internal diameter chosen to provide frictional engagement with an eyepiece of small diameter, a radial groove in said body adjacent said one of said plurality of ribs, and another of said plurality of ribs having a second internal diameter chosen to provide frictional engagement with an eyepiece of larger diameter, whereby a portion of said one of said plurality of ribs is displaced into said radial groove when the eyeshield is used with a larger diameter eyepiece.

2. The eyeshield according to claim 1 further including a shoulder extending radially inwardly from said body for controlling the amount of said eyeshield which covers an eyepiece.

3. The eyeshield according to claim 1 further including a lip at one end of said body.

4. The eyeshield according to claim 2 further including a lip at one end of said body.

5. The eyeshield according to claim 3 further including a shoulder extending radially inwardly from said body for controlling the amount of said eyeshield which covers an eyepiece.

6. The eyeshield according to claim 7 wherein said body has a thickness and flexibility chosen to permit a portion of said body to be folded back upon another portion of said body.

* * * * *